(12) United States Patent
Noh

(10) Patent No.: US 10,696,340 B2
(45) Date of Patent: Jun. 30, 2020

(54) TRANSFER PALLET WITH SUPPORT PLATE

(71) Applicant: Hong Il Noh, Gimhae-si (KR)

(72) Inventor: Hong Il Noh, Gimhae-si (KR)

(*) Notice: Subject to any disclaimer, the term of this patent is extended or adjusted under 35 U.S.C. 154(b) by 21 days.

(21) Appl. No.: 15/533,981

(22) PCT Filed: Feb. 13, 2017

(86) PCT No.: PCT/KR2017/001562
§ 371 (c)(1),
(2) Date: Jun. 7, 2017

(87) PCT Pub. No.: WO2017/142275
PCT Pub. Date: Aug. 24, 2017

(65) Prior Publication Data
US 2018/0346046 A1 Dec. 6, 2018

(30) Foreign Application Priority Data
Feb. 19, 2016 (KR) ........................ 10-2016-0019649

(51) Int. Cl.
| B62D 65/14 | (2006.01) |
| B62D 65/18 | (2006.01) |
| B65D 19/38 | (2006.01) |
| B65D 19/44 | (2006.01) |
| B65G 49/00 | (2006.01) |

(52) U.S. Cl.
CPC .......... B62D 65/18 (2013.01); B62D 65/14 (2013.01); B65D 19/38 (2013.01); B65D 19/44 (2013.01); B65G 49/00 (2013.01)

(58) Field of Classification Search
CPC .................. B62D 65/14; B62D 65/18
USPC .............. 206/335, 386; 248/346.5; 108/55.3, 108/57.16; 198/803.14
See application file for complete search history.

(56) References Cited

U.S. PATENT DOCUMENTS

| 5,101,964 | A | * | 4/1992 | Westphal | .............. | B23P 19/001 |
| | | | | | | 108/55.5 |
| 5,497,708 | A | * | 3/1996 | Jeruzal | .................. | B65D 19/44 |
| | | | | | | 108/54.1 |
| 5,575,389 | A | * | 11/1996 | Alspach | ............. | B60N 2/01508 |
| | | | | | | 108/55.5 |
| 5,894,803 | A | * | 4/1999 | Kuga | ..................... | B65D 85/64 |
| | | | | | | 108/51.11 |
| 6,474,245 | B2 | * | 11/2002 | Richard | ................ | B62B 5/0083 |
| | | | | | | 108/54.1 |
| 7,077,067 | B2 | * | 7/2006 | Bodde | .................... | B65D 19/44 |
| | | | | | | 108/55.1 |
| 7,980,389 | B1 | * | 7/2011 | Lee | .................... | B65D 19/0012 |
| | | | | | | 108/55.5 |

(Continued)

FOREIGN PATENT DOCUMENTS

| JP | 2000-128171 A | 5/2000 |
| KR | 10-2009-0036230 A | 4/2009 |
| KR | 10-1060373 B1 | 8/2011 |

*Primary Examiner* — Douglas A Hess
(74) *Attorney, Agent, or Firm* — John K. Park; Park Law Firm

(57) ABSTRACT

Disclosed is a transfer pallet for use in a conveyor line to load and carry a product thereon, such as an automobile component or an electronic component, in which the transfer pallet is provided with a support plate to load the product thereon in multiple stages.

6 Claims, 5 Drawing Sheets

(56) References Cited

U.S. PATENT DOCUMENTS 9,540,181 B2 * 1/2017 Ghirardi .................. B25H 1/00
9,951,550 B2 * 4/2018 Mccafferty ............... E05G 1/02

* cited by examiner

TRANSFER PALLET WITH SUPPORT PLATE

BACKGROUND OF THE INVENTION

Field of the Invention

The present invention relates to a transfer pallet for use in a conveyor line to load and carry a product thereon, such as an automobile component or an electronic component, and, more particularly, to a transfer pallet with a support plate to load products thereon in multiple stages.

Background of the Related Art

A transfer pallet is generally referred to as a conveyor board or a board. While the transfer pallet is running along a conveyor, a product is placed on the transfer pallet. Assembly or inspection of the product is carried out when the transfer pallet passes through the respective steps which is installed along the conveyor.

In order to sequentially carry out the assembling or inspecting work, a semi-finished product is placed on the transfer pallet moving on the conveyor. The conventional transfer pallet includes a base plate and a plurality of support blocks fixed to the base plate. The work is carried out in the state in which the product is fixed on the support blocks.

One example of a pallet for fixing an automobile seat which is designed to transfer the seat is disclosed in Korean Utility Model No. 0348460.

The pallet according to the related art includes a body having a plurality of brackets to support the seat on surfaces thereof, a C-shaped metal bar installed along an edge of the body, and a support which is pivotally installed to the body 1 to support a center portion of the metal bar. The seat placed on the body is supported by the metal bar, but there is a problem in that when another product is placed on the seat, a mark is formed on the seat itself.

Specifically, the conventional automobile seat consists of two front seats for a driver seat and a passenger seat, and two rear seats. Since four seats are used for one vehicle, the automobile seat is transferred on the conveyor in the state in which two rear seats are placed on two front seats. If a superimposing time of the rear seats on the front seats is extended, a mark is formed on the front seat due to a load of the rear seat, thereby deteriorating its quality.

In particular, since the rear seats are often loaded in such a way that headrests face downward, the load of the rear seat is concentrated on the headrest, and the front seat is formed with a mark by the headrest.

Another example of an automobile seat transfer pallet is disclosed in Korean Utility Model No. 20-0275271.

The pallet according to the related art includes a base plate made of monomer cast nylon to transfer the automobile seat on a conveyor, a middle plate engaged to a top surface of the base plate, and a plurality of heads made of synthetic resin which are provided with guide holes to connect the middle plate and the heads. It is designed only to support the front seat, which cannot solve the problem of forming the mark.

SUMMARY OF THE INVENTION

Therefore, an object of the present invention is to provide a transfer pallet for use in a conveyor line to load and carry a product thereon, such as an automobile component or an electronic component, in which the transfer pallet is provided with a support plate to load products thereon in multiple stages.

Another object of the present invention is to provide a transfer pallet with a support plate which can be pivoted by a pivoting device to regulate a position of the support plate, so that assembly or inspection work of a product is not interrupted.

In order to achieve the above objects, there is provided a transfer pallet capable of transferring a product along a conveyor line, including: a base plate which is brought into direct contact with a conveyor; a seating block which is fixed to the base plate to dispose the product thereon; and a support plate which is installed to one side of the base plate to load another product above the product loaded on the base plate.

With the above configuration, the transfer pallet is used for the conveyor line to load and carry the product thereon, such as an automobile component or an electronic component, in which the transfer pallet is provided with the support plate to load the product thereon in multiple stages, thereby improving utilization of a space. In addition, since the support plate is pivoted by the pivoting device, the position can be regulated, and the assembly or inspection work of the product is not interrupted.

DETAILED DESCRIPTION OF THE PREFERRED EMBODIMENT

Preferred embodiments of the present invention will now be described in detail with reference to the accompanying drawings.

Figure 1:
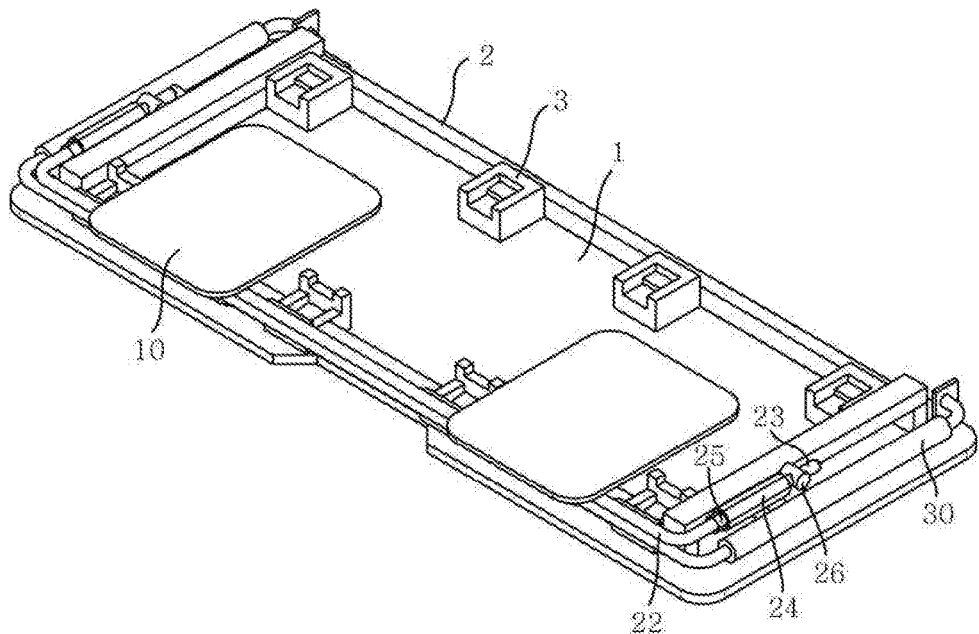
FIGS. 1 and 2 are perspective views illustrating the configuration of a transfer pallet according to an embodiment of the present invention.
Figure 2:
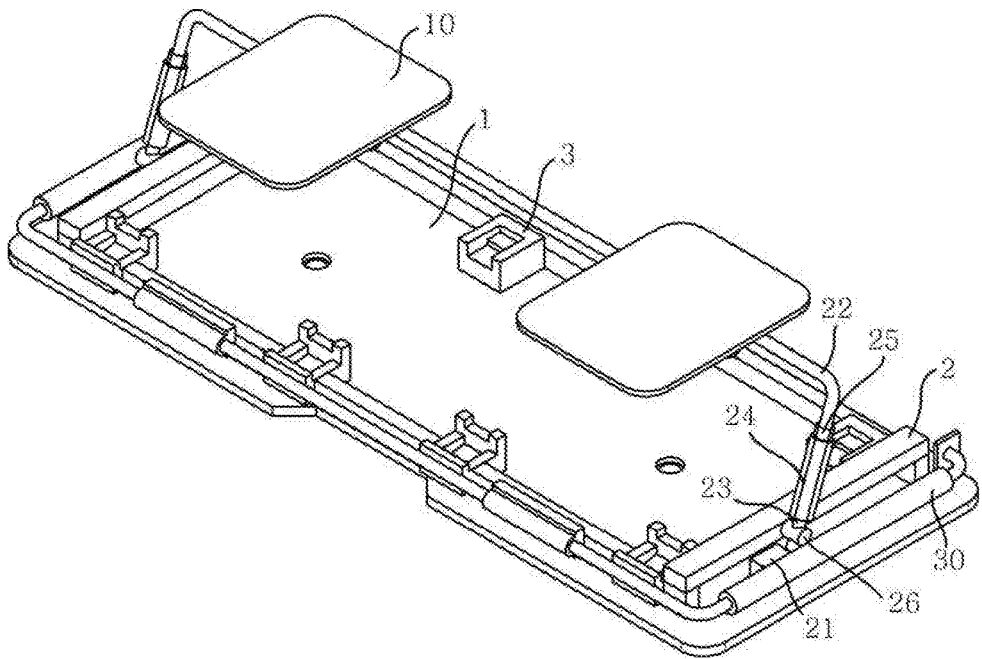
Figure 3:
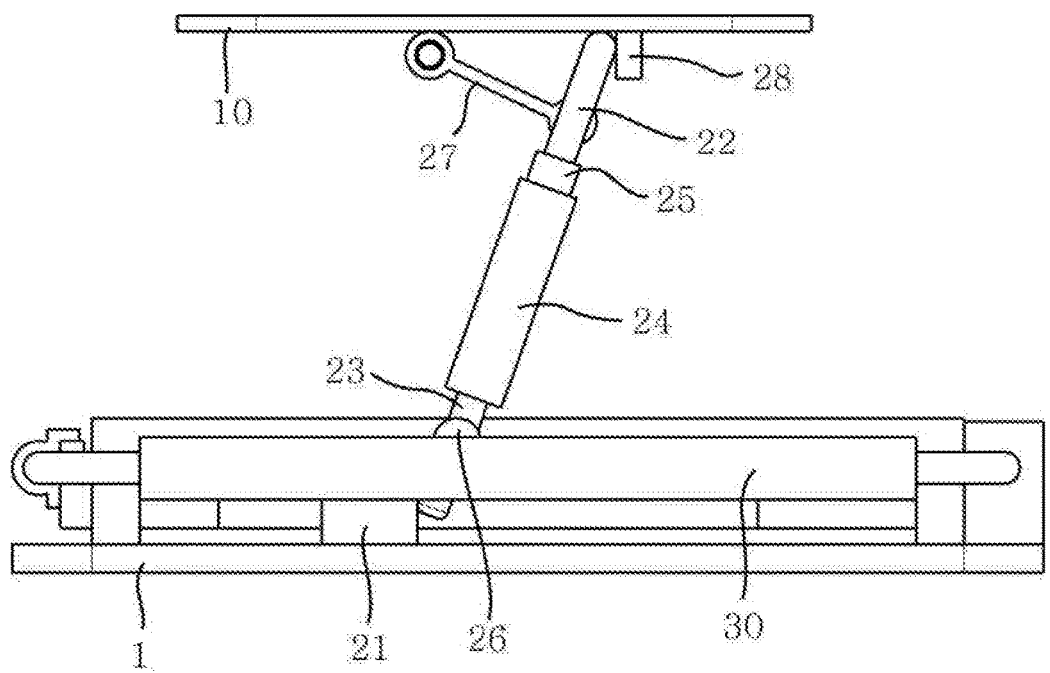
FIG. 3 is a view illustrating an operation of a support plate and a pivoting device according to the embodiment of the present invention.
Figure 4:
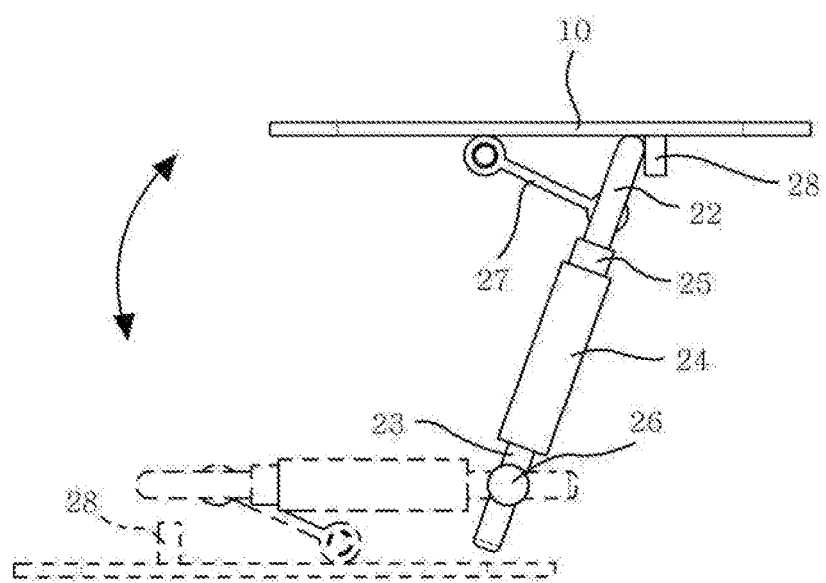
FIG. 4 is a view illustrating a pivoting state of the support plate according to the embodiment of the present invention.
Figure 5:
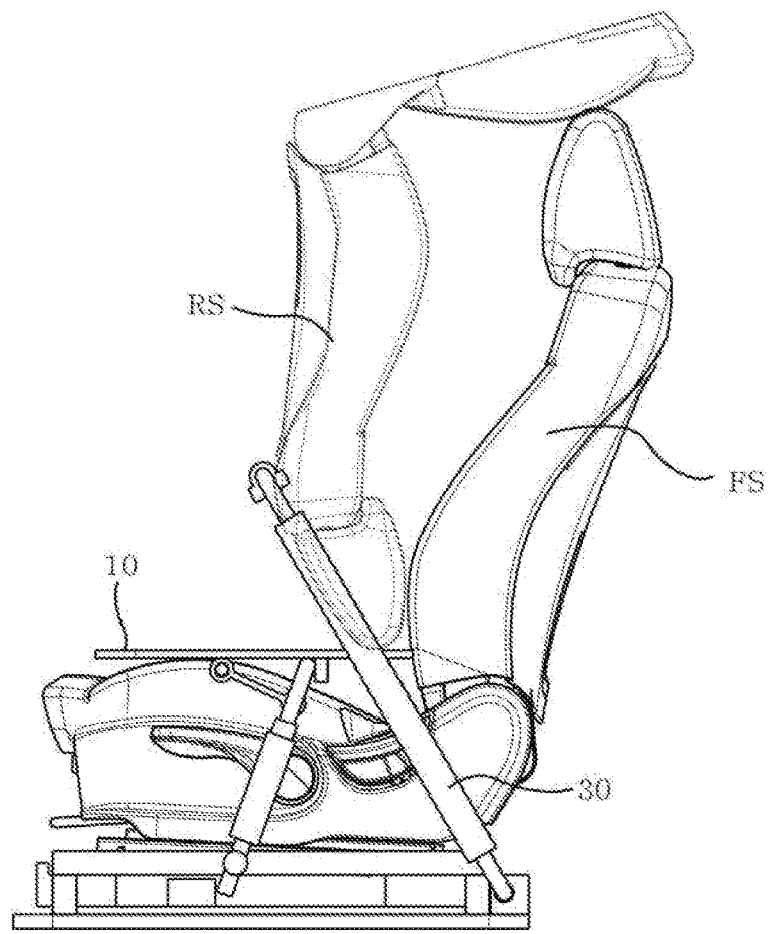
FIGS. 5 and 6 are views illustrating an operating state of the transfer pallet according to the embodiment of the present invention.
Figure 6:
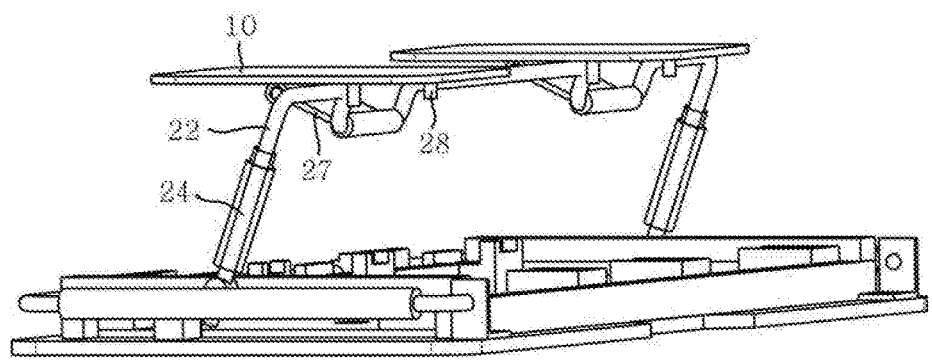
Figure 7:
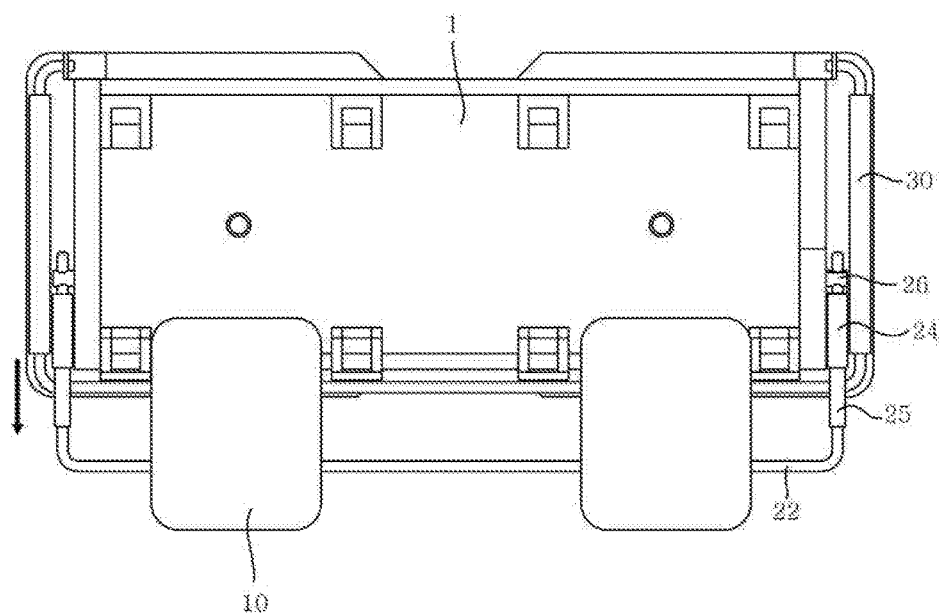
FIG. 7 is a plan view of the transfer pallet according to the embodiment of the present invention.

FIGS. 1 and 2 are perspective views illustrating the configuration of a transfer pallet according to an embodiment of the present invention. FIG. 3 is a view illustrating an operation of a support plate and a pivoting device according to the embodiment of the present invention. FIG. 4 is a view illustrating a pivoting state of the support plate according to the embodiment of the present invention. FIGS. 5 and 6 are views illustrating an operating state of the transfer pallet according to the embodiment of the present invention. FIG. 7 is a plan view of the transfer pallet according to the embodiment of the present invention. The transfer pallet with the support plate that transfers a product along a conveyor line according to the present invention includes a base plate 1 which is brought into direct contact with a conveyor, a seating block 3 fixed to the base plate 1 to dispose the product thereon, and a support plate installed to one side of the base plate 1 to load another product above the product loaded on the base plate.

The support plate 10 can be pivoted by a pivoting device 20, so that a position of the support plate is varied.

The base plate 1 is brought into direct contact with the conveyor in the state in which the base plate is placed on the conveyor, and is transferred by a conveyor belt or rollers. The base plate 1 has a core made of a metal or wood, and a coating applied on an outer surface of the core with urethane or the like.

An upper portion of the base plate 1 is engaged to reinforcing members 2 made of a metal, such as aluminum, to improve the strength of the base plate and maintain its shape, and a plurality of seating blocks 3 are engaged to one side of the reinforcing members 2, that is, the base plate 1, to conform to a shape of the product to be seated on the base plate. The seating blocks 3 may be made of synthetic resin, such as urethane, to support the load of the product and prevent the product from being cracked.

The support plate 10 installed to one side of the base plate 1 to load another product above the product loaded on the base plate. The support plate 10 is formed in a rectangular shape, such as a seating plate for a chair, of which corners are chamfered, or may be formed in any one of various cross-sectional shapes, such as a circle. Alternatively, the support plate 10 may be provided with grooves according to the shape of the product.

The support plate 10 can be pivoted by the pivoting device 20, and the pivoting device 20 has a hinge 26 rotatably fixed to the reinforcing member 2, and a rotary frame 22 engaged to the hinge 26 and being rotatable at a desired angle.

Specifically, the reinforcing member 2 is fixed to one side of the base plate 1, and the rotary frame is rotatably engaged to the reinforcing member 2 at a desired angle by the hinge 26. A front seat FS is fixed to the seating block 3 which is engaged to the base plate, as illustrated in FIG. 1, in the state in which the support plate 10 is positioned toward the base plate. If the support plate 10 is pivoted together with the rotary frame 22, the support plate is positioned above the front seat FS. And then, a rear seat RS is loaded on the support plate 10, so that the front seat FS and the rear seat RS can be seated and moved on the single pallet.

More specifically, the pivoting device 20 has the hinge 26 rotatably fixed to the reinforcing member 2, a coupling frame 23 engaged to the hinge 2, a cylinder 24 engaged to one side of the coupling frame 23, the rotary frame 22 engaged to a cylinder rod 25 of the cylinder 24 and also engaged to the support plate 10, and a stopper 21 for restricting a rotation angle of the rotary frame 22.

The reinforcing member 2 is formed with a groove, and the hinge 26 is inserted into the groove to be rotated therein. One end portion of the hinge is engaged to the coupling frame 23, and one end portion of the coupling frame 23 is engaged to the cylinder 24 having the cylinder rod. The rotary frame 22 is engaged to the cylinder rod 25 of the cylinder 24, so that rotary frame can be moved within a desired distance in an axial direction of the cylinder 24.

As illustrated in FIG. 7, if the rotary frame 22 is applied by a force in a direction to extract the cylinder rod 25 from the cylinder 24, the rotary frame 22 is pivoted to a position shown in FIG. 2. This prevents interruption to rotation of the support plate 10 and the rotary frame 22 due to the front seat FS which is previously mounted on the base plate 1.

Specifically, if the rotary frame 22 is rotated in the state in which the front seat FS is mounted on the base plate 1, as illustrated in FIG. 5, the rotary frame 22 or the support plate 10 may be caught by the front seat FS. In order to prevent such a case, the cylinder rod 25 engaged to the rotary frame 22 is extracted away from the cylinder in a direction of the arrow in FIG. 7 to increase a radius of rotation. And then, if the rotary frame is rotated, there is no interruption between the front seat FS and the rotary frame 22 or the support plate 10.

After the rotary frame 22 is rotated to a certain degree, the coupling frame 23 installed to one side of the rotary frame comes into contact with the stopper 21, so that the rotary frame does not further rotate to fix the position thereof.

One side of the base plate 1 is provided with the support frame 30. The support frame 30 is designed to prevent the rear seat RS seated on the support plate 10 from falling off from the support plate when the pallet is moving. The support frame 30 is configured to rotate at a desired angle, so that it rotates the support frame 30 to maintain the position of the rear seat RS after the rear seat RS is seated on the support plate 10.

As illustrated in FIGS. 4 and 6, the support plate 10 may be engaged to the rotary frame 22 by a link 27 to be rotated. A retaining bar 28 is engaged to one side of the rotary frame 22 to retain the position of the support plate 10.

Specifically, the support plate 10 is engaged to the rotary frame 22 by the link to turn around the rotary frame 22. When the support plate 10 rotates, it prevents the interruption between the front seat FS and the support plate. The retaining bar 28 is provided on a lower portion of the support plate 10, that is, a surface opposite to the seating surface of the rear seat RS to retain the turning support plate 10, so that the position of the support plate 10 can be maintained constantly to stably support the rear seat RS.

In addition, it is preferable that the cylinder 24 is maintained at its original position even in the state in which an external force is not applied thereto. The cylinder may include a shock absorber, an oil damper, an air damper, or a spring.

Specifically, if the cylinder is replaced by the spring, the rotary frame 22 is rotated in the state in which the spring is stretched, and if the external force is removed, the rotary frame 22 is returned to its original position by resilience of the spring. In the case where the support plate 10 according to the present invention is not employed, the support plate 10 is positioned just on the base plate, as illustrated in FIG. 1, thereby allowing the pallet to use conveniently.

Alternatively, the cylinder 24 may be replaced by a cylindrical housing which is fixed to the coupling frame 23, so that the rod is moved along the housing. A member for reducing a frictional force, such as DU bushing or a bearing, may be interposed between the housing and the rod, thereby lowering a load required for movement of the rod.

Figure 8:
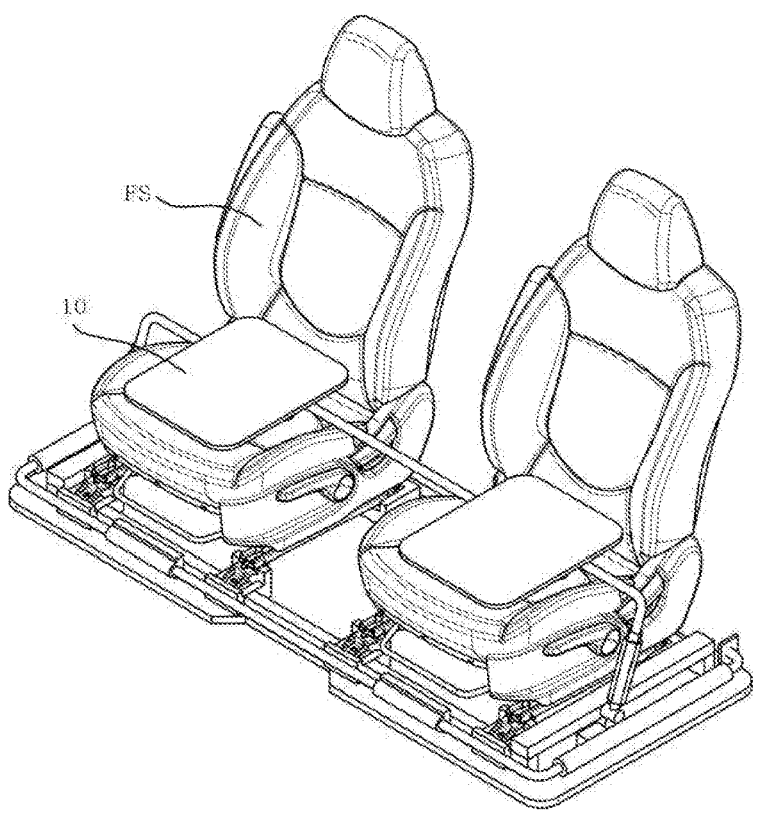
FIGS. 8 and 9 are views illustrating a using state of the transfer pallet according to the embodiment of the present invention.
Figure 9:
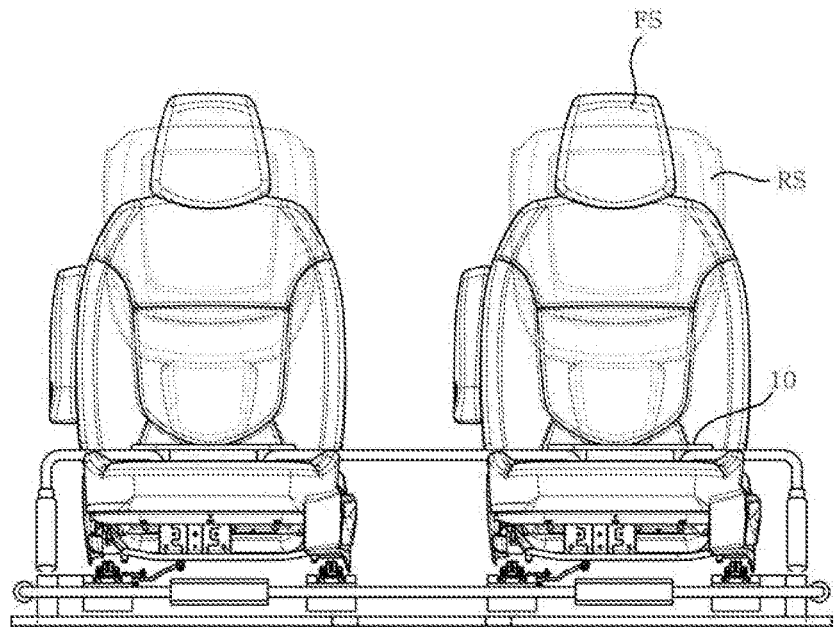

FIGS. 8 and 9 are views illustrating a using state of the transfer pallet according to the embodiment of the present invention. FIG. 8 shows that the front seat FS is mounted on the base plate 1, and the support plate 10 is pivoted to load the rear seat RS thereon. FIG. 9 shows the state of FIG. 8 when seen from the front, in which the rear seat RS indicated by an imaginary line is seated on the upper portion of the support plate 10.

Figure 10:
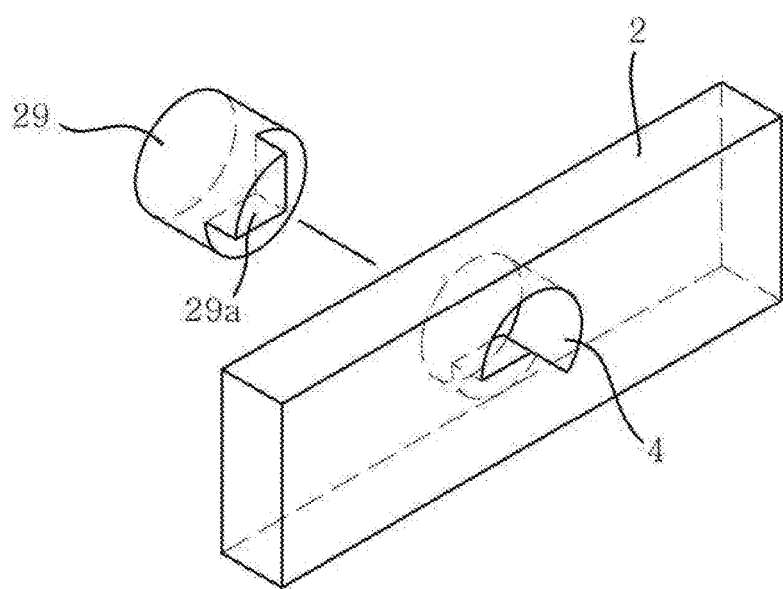
FIG. 10 is a view illustrating another example of a stopper.

FIG. 10 is a view illustrating another example of the stopper, in which the stopper 21 is replaced by a hinge and a hinge engaging groove.

Specifically, one side of a hinge 29 is provided with a protrusion 29a, and the protrusion 29a is inserted into a hinge engaging groove 4 formed on the reinforcing member 2. The hinge engaging groove 4 is formed with a groove so that the protrusion is rotated by a desired angle, thereby restricting a rotation angle of the hinge 29.

If an angle of the groove formed on the hinge engaging groove 4 is 225 degree, and the angle of the protrusion 29a is 90 degree, a rotatable angle of the hinge is a value obtained by subtracting 90 from 225, i.e., 135 degree.

The present invention provides the transfer pallet for use in the conveyor line to load and carry the product thereon, such as an automobile component or an electronic component, in which the transfer pallet is provided with the support plate to load the product thereon in multiple stages, thereby improving utilization of a space. In addition, since the support plate is pivoted by the pivoting device, the position can be regulated, and the assembly or inspection work of the product is not interrupted.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A transfer pallet capable of transferring a product along a conveyor line, comprising:
    a base plate (1) which is brought into direct contact with a conveyor;
    a seating block (3) which is fixed to the base plate (1) to dispose the product thereon; and
    a support plate (10) which is installed to one side of the base plate (1) to load another product above the product loaded on the base plate,
    wherein the support plate (10) is pivoted by a pivoting device (20), so that a position of the support plate is varied,
    wherein the cylinder (24) includes a cylindrical housing which is fixed to the coupling frame (23), so that the rod is moved along the housing, and a member for reducing a frictional force, including DU bushing or a bearing, is interposed between the housing and the rod, thereby lowering a load required for movement of the rod.

2. The transfer pallet according to claim 1, wherein the pivoting device (20) includes a hinge (26) rotatably fixed to a reinforcing member (2), and a rotary frame (22) engaged to the hinge (26) and being rotatable at a desired angle.

3. The transfer pallet according to claim 1, wherein the pivoting device (20) includes a hinge (26) rotatably fixed to a reinforcing member (2), a coupling frame (23) engaged to the hinge (26), a cylinder (24) engaged to one side of the coupling frame (23), a rotary frame (22) engaged to a cylinder rod (25) of the cylinder (24) and also engaged to the support plate (10), and a stopper (21) for restricting a rotation angle of the rotary frame (22).

4. The transfer pallet according to claim 3, wherein the cylinder (24) includes a spring, and if the rotary frame (22) is rotated in a state in which the spring is stretched, and then an external force is removed, the rotary frame (22) is returned to its original position by resilience of the spring.

5. The transfer pallet according to claim 1, wherein the support plate (10) is engaged to a rotary frame (22) by a link (27) so as to be rotated, and a retaining bar (28) is engaged to one side of the rotary frame (22) to retain a position of the support plate (10).

6. A transfer pallet capable of transferring a product along a conveyor line, comprising:
    a base plate (1) which is brought into direct contact with a conveyor;
    a seating block (3) which is fixed to the base plate (1) to dispose the product thereon; and
    a support plate (10) which is installed to one side of the base plate (1) to load another product above the product loaded on the base plate,
    wherein the support plate (10) is pivoted by a pivoting device (20), so that a position of the support plate is varied,
    wherein the pivoting device (20) includes a hinge (29) which is provided on one side thereof with a protrusion (29a), and the protrusion (29a) is inserted into a hinge engaging groove (4) formed on a reinforcing member (2), the hinge engaging groove (4) being formed with a groove so that the protrusion is rotated by a desired angle, thereby restricting a rotation angle of the hinge (29).

* * * * *